H. S. DOLBEY.
DENTAL MIRROR.
APPLICATION FILED MAR. 20, 1920.

1,387,770. Patented Aug. 16, 1921.

INVENTOR
Harry S. Dolbey.
BY
Howard C. Barlow
ATTORNEY

UNITED STATES PATENT OFFICE.

HARRY S. DOLBEY, OF PROVIDENCE, RHODE ISLAND.

DENTAL MIRROR.

1,387,770.   Specification of Letters Patent.   Patented Aug. 16, 1921.

Application filed March 20, 1920. Serial No. 367,311.

*To all whom it may concern:*

Be it known that I, HARRY S. DOLBEY, a citizen of the United States, and resident of the city of Providence, in the county of Providence and State of Rhode Island, have invented certain new and useful Improvements in Dental Mirrors, of which the following is a specification.

This invention relates to improvements in dental instruments and more particularly to an illuminated dental mirror; and has for its object to provide such an instrument having an electric lamp with an opaque, reflecting member located in front of or over said lamp and in position to prevent the direct rays of light from shining into the eyes of the operator, and the said member being so arranged as to permit the passage of the rays of light about its opaque surface to illuminate the interior of the patient's mouth whereby the image of the illuminated object may be plainly visible in the mirror.

The nature and advantages of the invention will be better understood when the following detail dscription is taken in connection with the accompanying drawings, the invention residing in the combination and arrangement of parts as claimed.

In the drawings forming part of this specification like numerals of reference indicate similar parts in the several views and wherein:—

Figure 1:
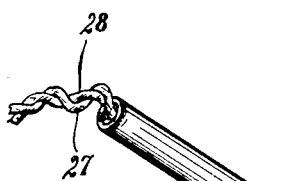
Figure 1 is a perspective view illustrating the general structure and arrangement of my improved dental mirror.
Figure 2:
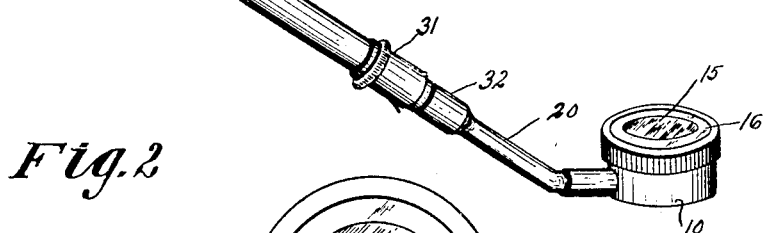
Fig. 2 is a face view of the mirror plate, illustrating the opaque surface covering the lamp and the transparent surface about the same through which the light-rays are permitted to pass.

It is found in the practical use of dental mirrors to be of great importance to illuminate the interior of the mouth of a patient, but the light must be so positioned as not to permit its direct rays to shine into the eyes of the operator, so as to interfere with his being able to clearly see the image of the illuminated object, in the mirror. Therefore to accomplish this I have positioned the opaque portion of the mirror directly over the lamp so as to shield or shut out the direct rays from the eyes of the observer and permit the light to be reflected around or about the mirror portion.

The following is a detail description of one construction embodying my invention in which 10 designates the casing, preferably of metal, which is polished or provided with a reflecting inner surface 11. The upper edge of this casing is grooved as at 16 to receive a rubber packing ring 13 on which ring is set a mirror plate 14, the center portion 15 of which is preferably silvered or otherwise rendered opaque in its back while around this mirror portion the plate is rendered transparent, as at 16.

In order to secure this plate in position, I have provided a flange cap 17 which is threaded on its inside at 18 onto the upper edge of said casing, whereby when this flange cap is screwed down tightly into position, the plate 14 is forced against the packing ring 17 rendering the casing water-tight, whereby it may be sterilized after each operation without affecting its interior parts.

A tubular handle member 19 is secured to the side of this casing and is turned up at an angle 20, its end being interiorly threaded at 21, to receive the hard rubber handle portion 22.

Figure 3:
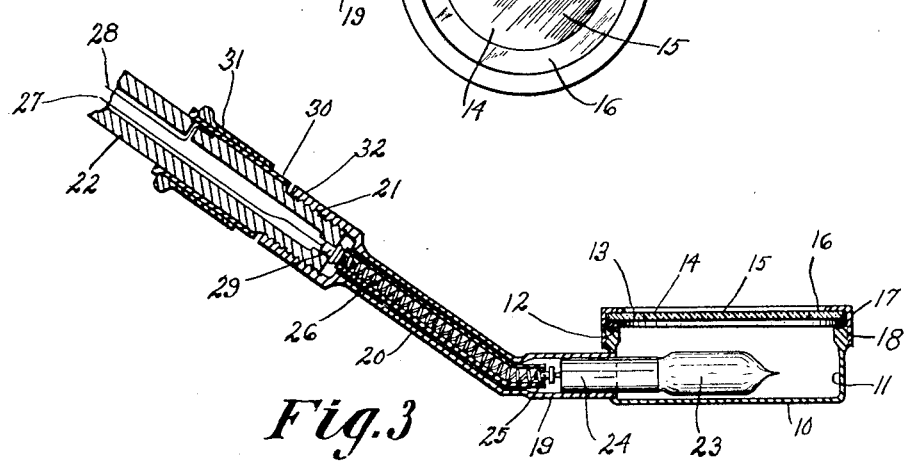
Fig. 3 is a central sectional side elevation illustrating the general construction of the device.

Projecting into this casing from the tubular handle is an electric lamp 23 which I have shown as extending substantially to the center of the casing or to a point directly beneath the opaque portion of the mirror or plate 14. The metal end 24 of this lamp engages a contact pin 26 which is pressed inwardly by a coil spring 26 to make center contact therewith, the wall portion 20 of the tube forming the outer conductor. Two supply wires 27 and 28 which may be led from any convenient source of electric energy, are provided, one leading to the terminal 29 at the upper end of the coil spring while the other is connected to the collar 30 on which is mounted the sliding sleeve 31 whereby when it is desired to close the circuit and light the lamp it is only necessary to slide this sleeve 31 over to bridge the space between it and the enlarged portion 32 of the tube 20, and when it is desired to break the circuit it is returned by the thumb of the operator into the position shown in Figs. 1 and 3.

I have shown the lamp and the opaque portion of the mirror plate as being in the center of the casing, but I do not wish to be restricted to this particular arrangement of the parts as the light may be at one edge of the casing, if desired; but in whatever position the lamp may be placed the plate must be so arranged as to prevent the direct rays of light from shining into the eyes of the operator and at the same time permit these rays to shine out about this opaque or light-shielding portion to illuminate the interior of the mouth of the patient.

By providing a reflecting surface on the inner side of the casing the illuminating power of the light rays is rendered much more effective when shining out about the opaque or light-controlling surface.

This device is extremely practical and effective in its operation and by its use the dentist may operate more accurately and detect defects in the teeth, which could not otherwise be observed.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. An instrument of the class described, comprising an operating handle, an electric lamp supported at one end thereof, an opaque member adapted to be positioned between said lamp and the eye of the observer to cut off the direct rays, a mirror on the outer surface of the opaque member serving to reflect the image of the work, and a space being provided about the edge of said member to permit the passage of light rays thereabout.

2. An instrument of the character described, comprising a casing lined with light-reflecting material and having a supporting handle, an electric lamp in said casing, an opaque plate mounted in said casing over said lamp and adapted to be positioned between the lamp and the eye of the observer, said plate carrying a mirror on its outer surface, and an unobstructed light passageway being provided between the opaque surface and the edge of the casing to permit the passage of light rays therethrough.

3. An instrument of the character described, comprising a casing having a supporting handle, an electric lamp in said casing, a plate secured to said casing having an opaque portion with a reflecting outer face in front of said lamp and having a transparent portion about said opaque portion to permit the passage of light rays therethrough, and said casing being provided with a light-reflecting surface for directing the light rays through said transparent portion.

In testimony whereof I affix my signature.

HARRY S. DOLBEY.